(12) United States Patent
Yim et al.

(10) Patent No.: US 11,659,879 B2
(45) Date of Patent: May 30, 2023

(54) FLEXIBLE BATTERY CONNECTION STRUCTURE AND BELT COMPRISING THE SAME

(71) Applicant: AMOGREENTECH CO., LTD., Gimpo-si (KR)

(72) Inventors: Mun Su Yim, Suwon-si (KR); Dong Woo Kim, Chungcheongnam-do (KR); Gi Wook Lee, Yongin-si (KR); Seung Yun Rho, Hwaseong-si (KR)

(73) Assignee: Amogreentech Co., Ltd., Gimpo-si (KR)

( * ) Notice: Subject to any disclaimer, the term of this patent is extended or adjusted under 35 U.S.C. 154(b) by 768 days.

(21) Appl. No.: 16/620,575

(22) PCT Filed: Jun. 21, 2018

(86) PCT No.: PCT/KR2018/006994
§ 371 (c)(1),
(2) Date: Dec. 9, 2019

(87) PCT Pub. No.: WO2018/236156
PCT Pub. Date: Dec. 27, 2018

(65) Prior Publication Data
US 2020/0099033 A1 Mar. 26, 2020

(30) Foreign Application Priority Data

Jun. 22, 2017 (KR) .................. 10-2017-0079023
Jun. 19, 2018 (KR) .................. 10-2018-0070107

(51) Int. Cl.
*A41F 9/00* (2006.01)
*H01M 50/211* (2021.01)
(Continued)

(52) U.S. Cl.
CPC .......... *A41F 9/002* (2013.01); *H01M 50/211* (2021.01); *H01M 50/238* (2021.01);
(Continued)

(58) Field of Classification Search
CPC . A41F 9/002; H01M 2220/30; H01M 50/211; H01M 50/238; H01M 50/256;
(Continued)

(56) References Cited

U.S. PATENT DOCUMENTS

2015/0162577 A1* 6/2015 Takano ............... H01M 50/256
429/65

FOREIGN PATENT DOCUMENTS

CN 101752541 A 6/2010
CN 203026608 U 6/2013
(Continued)

*Primary Examiner* — Lingwen R Zeng
(74) *Attorney, Agent, or Firm* — Rothwell, Figg, Ernst & Manbeck, P.C.

(57) ABSTRACT

A flexible battery connection structure is provided. A flexible battery connection structure according to an exemplary embodiment of the present invention comprises: a plurality of flexible batteries electrically connected to each other, disposed along a longitudinal direction, and each including a positive electrode terminal and a negative electrode terminal protruding from one end portions; a connection member disposed at positions corresponding to the positive electrode terminal and the negative electrode terminal to protect the positive electrode terminal and the negative electrode terminal and connect two flexible batteries adjacent to each other; and a housing configured to surround the plurality of flexible batteries connected to each other through the connection members.

16 Claims, 9 Drawing Sheets

(51) Int. Cl.
*H01M 50/256* (2021.01)
*H01M 50/238* (2021.01)
*H01M 50/503* (2021.01)
*H01M 50/507* (2021.01)
*H01M 50/512* (2021.01)
*H01M 50/524* (2021.01)
*H01M 50/296* (2021.01)
*H01M 50/502* (2021.01)

(52) U.S. Cl.
CPC ....... *H01M 50/256* (2021.01); *H01M 50/296* (2021.01); *H01M 50/503* (2021.01); *H01M 50/507* (2021.01); *H01M 50/512* (2021.01); *H01M 50/524* (2021.01); *H01M 50/502* (2021.01); *H01M 2220/30* (2013.01)

(58) Field of Classification Search
CPC ............. H01M 50/296; H01M 50/502; H01M 50/503; H01M 50/507; H01M 50/512; H01M 50/524; H02J 7/00; H02J 7/0044; Y02E 60/10
See application file for complete search history.

(56) References Cited

FOREIGN PATENT DOCUMENTS

| | | |
|---|---|---|
| JP | 2002050330 A | 2/2002 |
| JP | 3794213 B2 | 7/2006 |
| KR | 20-0212929 Y | 2/2001 |
| KR | 20160089105 A | 7/2016 |
| KR | 20160129498 A | 11/2016 |

* cited by examiner

FLEXIBLE BATTERY CONNECTION STRUCTURE AND BELT COMPRISING THE SAME

CROSS REFERENCE TO RELATED APPLICATION

This application is the national phase entry of International Application No. PCT/KR2018/006994, filed on Jun. 21, 2018, which is based upon and claims priority to Korean Patent Applications 10-2017-0079023, filed on Jun. 22, 2017 and Korean Patent Applications 10-2018-0070107, filed on Jun. 19, 2018. The entire contents of which are incorporated herein by reference.

TECHNICAL FIELD

The present invention relates to a flexible battery connection structure and a belt including the same.

BACKGROUND

As external electronic devices become smaller and slimmer today, batteries embedded in the external electronic devices are also limited in size. Accordingly, the battery does not provide a sufficient capacity so that external electronic devices can be used for a long time.

As an example, a smart phone, which is one of the external electronic devices, has various additional functions such as search, finance, video playback, and the like in addition to a basic call function.

Accordingly, frequency of use and a usage time of a user are gradually increasing, and required power used in a process of performing the various functions also inevitably increases.

Accordingly, the battery of the smart phone itself often fails to exceed one day due to the limitation in capacity, and at least one replacement of the battery per day or continuous charging through a charging cable is required.

Specifically, since recent smart phones are manufactured in a battery-integrated type (built-in type) in which a battery cannot be replaced, it is common to purchase and carry various types of rechargeable auxiliary batteries instead of a replaceable battery.

However, charging through the charging cable may not be possible depending on a surrounding environment, and a conventional rechargeable auxiliary battery is inconvenient to carry and has a small storage capacity.

Accordingly, development for increasing the storage capacity of the rechargeable auxiliary battery proceeds. For example, in order to increase the storage capacity of the rechargeable auxiliary battery, the overall length or area of the battery can be increased.

However, when the battery is implemented with a large area, the storage capacity can be increased, but since the size of the battery increases, portability is degraded. Further, when the length of the battery is increased, the size of the battery can be relatively reduced in comparison with the battery with the large area, but a charging time increases.

In addition, when one battery is implemented to have a long size, since the length of the battery varies according to the storage capacity to be realized, it is difficult to manufacture batteries having various sizes through one facility.

Accordingly, a method of decreasing the charging time while increasing the storage capacity of the battery by increasing the entire length of the battery has been demanded.

SUMMARY OF THE INVENTION

The present invention is directed to providing a flexible battery connection structure capable of increasing the overall length of a battery to increase storage capacity and decreasing a charging time.

Further, the present invention is directed to providing a flexible battery connection structure capable of flexibly coping with modification in a longitudinal direction.

Meanwhile, the present invention is directed to providing a belt that can be used as an auxiliary battery while increasing portability by embedding a flexible battery connection structure in a belt always worn by a user.

One aspect of the present invention provides a flexible battery connection structure including: a plurality of flexible batteries electrically connected to each other, disposed along a longitudinal direction, and each including a positive electrode terminal and a negative electrode terminal protruding from one end portions; a connection member disposed at positions corresponding to the positive electrode terminal and the negative electrode terminal to protect the positive electrode terminal and the negative electrode terminal and connect two flexible batteries adjacent to each other; and a housing configured to surround the plurality of flexible batteries connected to each other through the connection member.

Further, the connection member may be disposed to surround end portions of the two flexible batteries having one end portion disposed adjacent to each other, and two flexible batteries disposed adjacent to each other among the plurality of flexible batteries may be disposed so that the positive electrode terminal and the negative electrode terminal may be disposed to face each other or so that some of the lengths thereof may overlap each other.

In this case, each of the connection member and the housing may be formed of a material having flexibility. Accordingly, when the flexible battery connection structure is bent, a connecting portion between the flexible batteries may be smoothly bent.

As an example, the housing may be a shrink tube having heat resistance, and the connection member may be formed of an acrylic resin or a Teflon resin.

Further, the plurality of flexible batteries may be electrically connected to each other through at least two conductive members, and the two conductive members may be disposed to be located at both side surfaces of the flexible battery. Accordingly, in the flexible battery connection structure according to one embodiment of the present invention, since the conductive members configured to connect the plurality of flexible batteries are not disposed on an upper surface or a lower surface of the flexible battery, an increase in thickness due to the conductive members may be prevented.

Further, the flexible battery connection structure may include at least one connection terminal for electrical connection to an external electronic device.

In addition, the flexible battery may include patterns for contraction and relaxation in a longitudinal direction when bent. As an example, the flexible battery may include an electrode assembly; and an exterior material which encapsulates the electrode assembly and an electrolyte, the patterns may include a first pattern formed in the electrode assembly and a second pattern formed in the exterior material, and the first pattern and the second pattern may be formed to coincide with each other.

Meanwhile, another aspect of the present invention provides a belt including: a belt portion having a predetermined length and configured to surround a waist of a user; a fastening part configured to fasten or unfasten both end portions of the belt portion; and the above-described flexible battery connection structure embedded in the belt portion.

Further, the fastening part may include at least one connection terminal for electrical connection to an external electronic device. Accordingly, the belt may be used as a power source configured to supply power to an external electronic device.

According to the present invention, since a flexible battery connection structure having a long size is implemented by connecting a plurality of flexible batteries each having a unit length, storage capacity can be increased and a charging time can be decreased.

Further, since the present invention can flexibly cope with deformation in a longitudinal direction, performance degradation of or damage to the battery can be prevented even when bending in the longitudinal direction occurs. Accordingly, the present invention may be efficiently applied to a product which is bendable and has a long length, for example, a belt, suspenders, or the like.

Further, the present invention can improve portability by allowing an external electronic device to be charged through a built-in flexible battery while performing a unique function of the product, for example, a function as a belt which surrounds a waist of a user to prevent clothing from falling down, and can easily charge the battery of an external electronic device regardless of location.

DETAILED DESCRIPTION OF THE INVENTION

Figure 1:
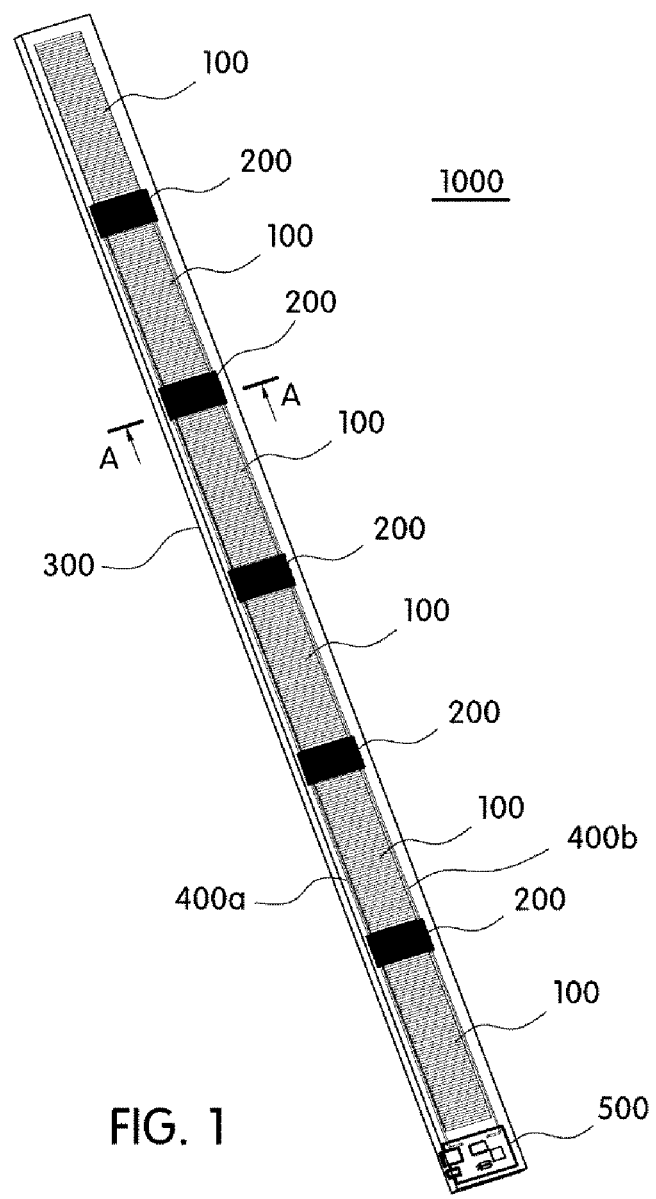
FIG. 1 is a view illustrating a flexible battery connection structure according to one embodiment of the present invention.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

Figure 6:
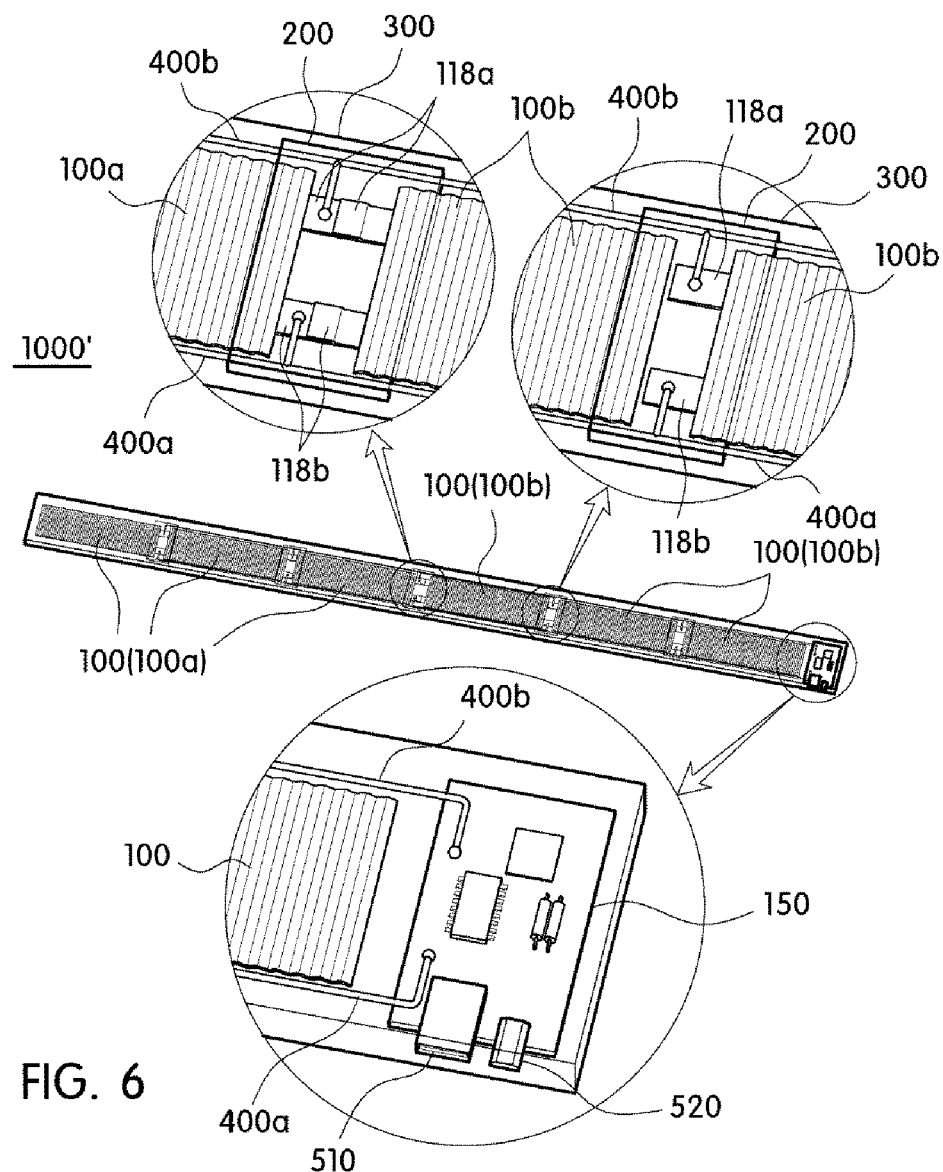
FIG. 6 is a view illustrating a modified example of FIG. 1.

As shown in FIGS. 1 and 6, a flexible battery connection structure 1000 or 1000' according to one embodiment of the present invention includes a plurality of flexible batteries 100, connection members 200, and a housing 300.

The flexible battery 100 may be provided in a plate shape having a predetermined length. The above-described flexible battery 100 may include a pair of positive electrode terminals 118a and negative electrode terminals 118b for electrical connection, and the pair of positive electrode terminals 118a and negative electrode terminals 118b may protrude from end portions in a longitudinal direction.

In this case, the flexible battery 100 may be provided in plural in number, and the plurality of flexible batteries 100 may be electrically connected to each other through at least two conductive members 400a and 400b in a state of being arranged in line along one direction.

As an example, the plurality of flexible batteries 100 may be arranged so that one end portions are adjacent to each other along a direction parallel to the longitudinal direction of the flexible batteries 100.

Accordingly, the entire length of the flexible battery connection structure 1000 or 1000' according to one embodiment of the present invention may be increased by arranging the plurality of flexible batteries 100 each having the predetermined length in line along the longitudinal direction and then electrically connecting the plurality of flexible batteries 100.

That is, the entire length of the flexible battery connection structure 1000 or 1000' according to one embodiment of the present invention may be increased by connecting the plurality of flexible batteries 100, and thus the number of used flexible batteries 100 may be increased or decreased to freely change an entire length of the flexible battery connection structure 1000 or 1000'.

Accordingly, the flexible battery connection structure 1000 or 1000' according to one embodiment of the present invention may be freely implemented in various lengths according to an entire length of a product to be applied, and may be efficiently applied to various products.

Further, even when the entire length of the flexible battery connection structure 1000 or 1000' according to one embodiment of the present invention is increased, since the flexible battery connection structure 1000 or 1000' is implemented in a form in which the plurality of flexible batteries each having a relatively short length are connected to each other, the batteries may be recharged in a relatively short time when recharging is necessary in comparison with a case in which the flexible battery connection structure 1000 or 1000' is implemented as one flexible battery having a long length.

In this case, the flexible batteries 100 may have different lengths but may also have the same length. That is, the plurality of flexible batteries 100 may be provided to have the same length and then be arranged in line.

Accordingly, in the flexible battery connection structure 1000 or 1000' according to one embodiment of the present invention, since the flexible batteries 100 having the same length may be mass-produced in large quantities through one equipment, production costs may be reduced.

Figure 2:
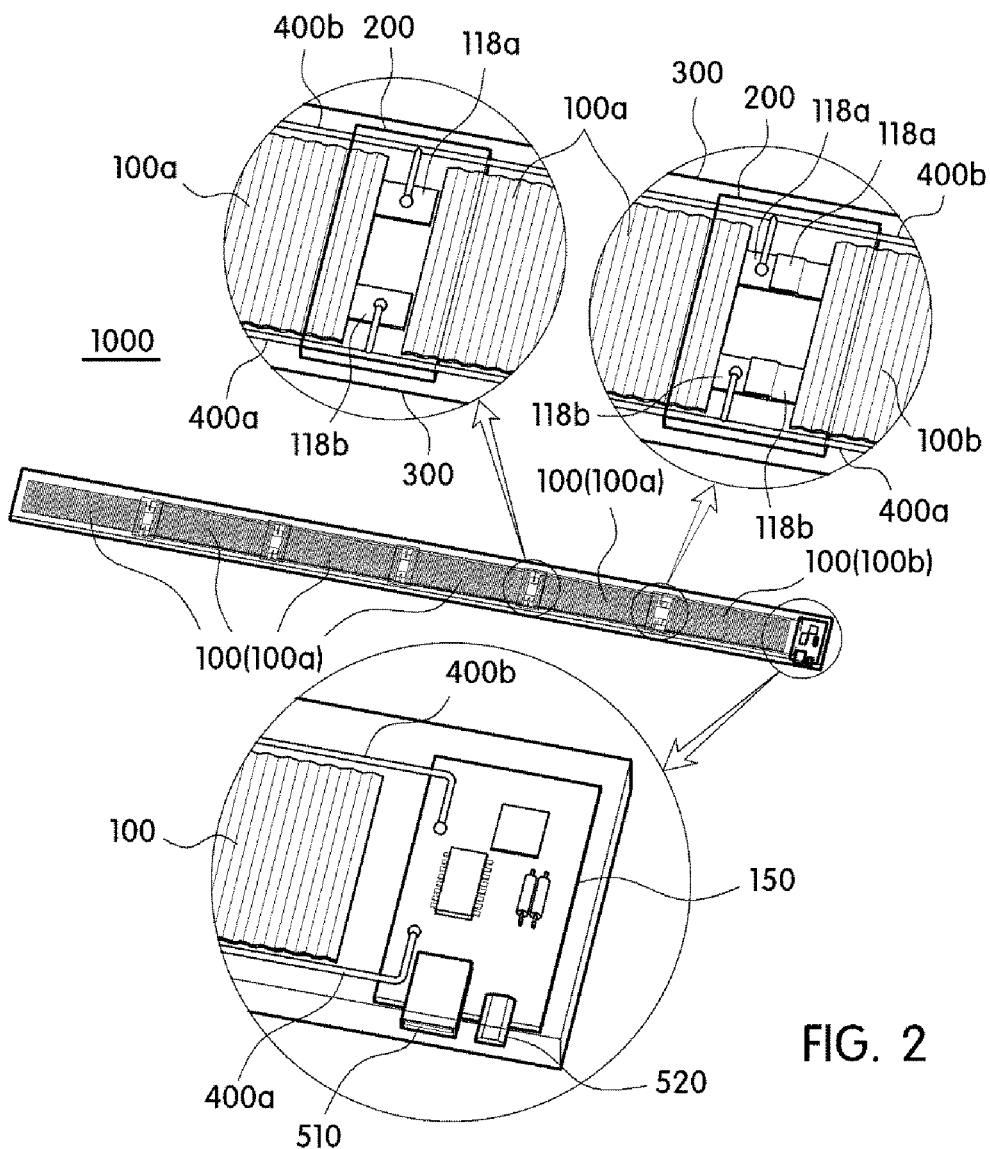
FIG. 2 is an enlarged view of a portion of the flexible battery connection structure according to one embodiment of the present invention.

In this case, as shown in FIG. 2, two flexible batteries 100a and 100b disposed adjacent to each other among the plurality of flexible batteries 100 may be disposed so that the positive electrode terminals 118a and the negative electrode terminals 118b protruding from the flexible batteries 100a and 100b face each other.

Accordingly, in the flexible battery connection structure 1000 or 1000' according to one embodiment of the present invention, the positive electrode terminals and the negative electrode terminals of the flexible batteries disposed at a first end and a last end among the plurality of flexible batteries 100 which are arranged in line may be disposed to always face an inner side of the flexible battery connection structure 1000 or 1000'.

Accordingly, in the flexible battery connection structure 1000 or 1000' according to one embodiment of the present invention, since the positive electrode terminals 118a and the negative electrode terminals 118b are disposed not to protrude outward, the risk of damaging the positive electrode terminals and negative electrode terminals due to an external force may be prevented even when the external force is applied to both end portions of the flexible battery connection structure 1000 or 1000'.

In the present invention, as shown in FIG. 2, one of the two flexible batteries 100a and 100b disposed adjacent to each other may be the flexible battery 100 located at the last end among the plurality of flexible batteries, but present invention is not limited thereto, and as shown in FIG. 6, may be a remaining flexible battery other than the flexible batteries 100 disposed at the first end and the last end among the plurality of flexible batteries 100.

Figure 5:
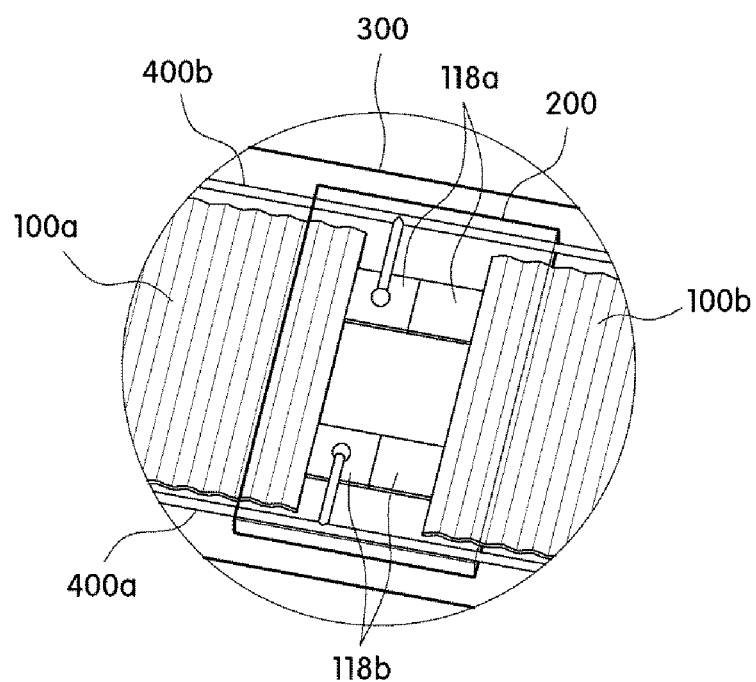
FIG. 5 is a schematic view illustrating a shape in which two positive electrode terminals and two negative electrode terminals facing each other are disposed in parallel in the flexible battery connection structure according to one embodiment of the present invention.

Further, the two positive electrode terminals 118a and the two negative electrode terminals 118b disposed to face each other may be disposed not to overlap each other as shown in FIG. 2, and may be disposed so that at least some of the entire lengths of the positive electrode terminals 118a and the negative electrode terminals 118b overlap each other as shown in FIG. 5.

Meanwhile, the flexible battery connection structure 1000 or 1000' according to one embodiment of the present invention may include the connection members 200.

The above-described connection member 200 may protect the positive electrode terminals 118a and the negative electrode terminals 118b protruding from the flexible batteries 100 while connecting the two flexible batteries 100 adjacent to each other.

To this end, the connection members 200 may be disposed at positions corresponding to the positive electrode terminals 118a and the negative electrode terminals 118b protruding from the flexible batteries 100, and may be disposed to simultaneously cover the positive electrode terminals and the negative electrode terminals.

That is, as shown in FIGS. 2 and 6, the connection members 200 may be disposed between the two flexible batteries 100 adjacent to each other, and may be disposed to simultaneously cover the two positive electrode terminals 118a and the two negative electrode terminals 118b protruding from each of the flexible batteries 100.

In this case, the connection members 200 may be disposed to cover end portions of the two flexible batteries 100 of which both end portions are disposed adjacent to each other. Accordingly, since some of the entire lengths of the two flexible batteries 100 adjacent to each other overlap the connection members 200, the two flexible batteries 100 may be connected to each other through the connection members 200.

Further, the connection member 200 may be formed of a material having flexibility. As an example, the connection member 200 may be formed of an acrylic resin or a Teflon resin, but is not limited thereto, and a material deformable by an external force may be used without limitation.

Figure 4:
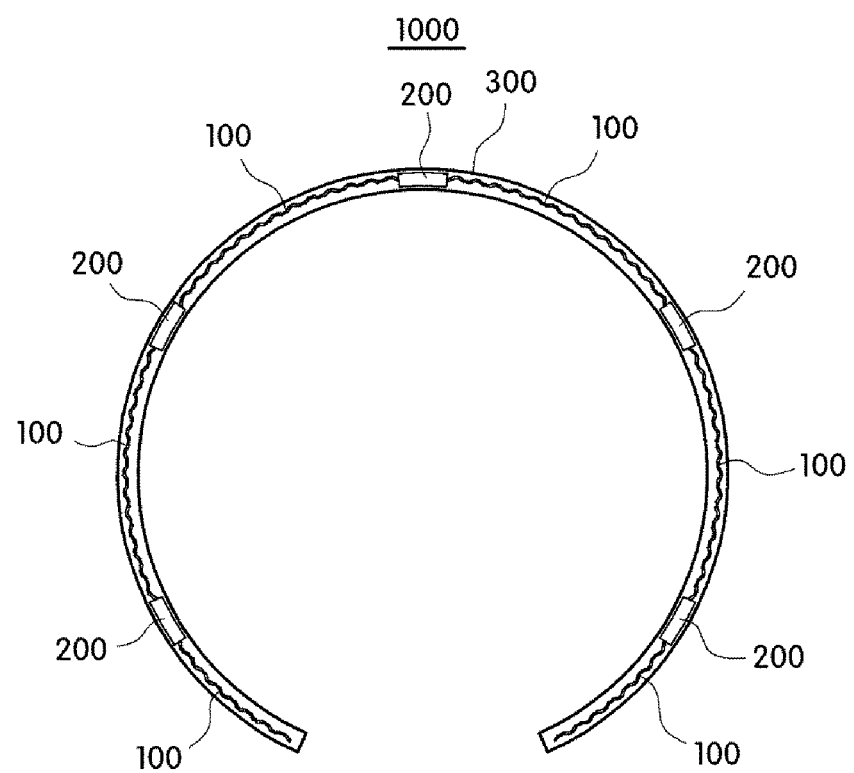
FIG. 4 is a schematic view illustrating a state in which the flexible battery connection structure according to one embodiment of the present invention is bent.

Accordingly, as shown in FIG. 4, even when the flexible battery connection structure 1000 or 1000' according to one embodiment of the present invention is bent or curved in carrying or using, the positive electrode terminals 118a and the negative electrode terminals 118b protruding from the flexible batteries 100 may be protected by the connection members 200.

Accordingly, even when a connecting portion between the two flexible batteries 100 adjacent to each other is bent, since the positive electrode terminals 118a and the negative electrode terminals 118b are protected by the connection members 200, damage or breakage due to bending may be prevented.

Further, since the connection members 200 are formed of a bendable material having flexibility, when the flexible battery connection structure 1000 or 1000' is bent or curved, excessive bending or curving at portions where the positive electrode terminals and the negative electrode terminals are disposed may be prevented. Accordingly, in the flexible battery connection structure 1000 or 1000', a connecting portion between the two flexible batteries 100 adjacent to each other may be curved with a curvature similar to those of other portions.

Meanwhile, in the flexible battery connection structure 1000 or 1000' according to one embodiment of the present invention, the plurality of flexible batteries 100 may be electrically connected to each other through the conductive members 400a and 400b.

As an example, as shown in FIG. 2, the plurality of flexible batteries 100 may be connected to each other in parallel through the two conductive members 400a and 400b.

That is, in the flexible battery connection structure 1000 or 1000' according to one embodiment of the present invention, after the plurality of flexible batteries 100 are disposed in a longitudinal direction, the plurality of flexible batteries 100 may have a form of being connected in parallel through the two conductive members 400a and 400b such as an electric wire.

Accordingly, in the flexible battery connection structure 1000 or 1000' according to one embodiment of the present invention, since the plurality of flexible batteries 100 are connected in parallel, storage capacity may freely increase as much as the number of used flexible batteries 100 connected to each other.

As an example, when the flexible battery connection structure 1000 or 1000' having a storage capacity of 5000 mAh is desired to be implemented, the capacity of 5000 mAh may be realized by connecting five flexible batteries 100 each having a storage capacity of 1000 mAh in parallel.

Further, when the flexible battery connection structure 1000 or 1000' having a storage capacity of more than 5000 mAh is desired to be implemented, the required storage capacity may be conveniently increased by increasing the number of flexible batteries connected to each other in parallel.

As described above, in the flexible battery connection structure 1000 or 1000' according to one embodiment of the present invention, high storage capacity may be easily realized by increasing the number of used flexible batteries 100.

However, a connecting method of the plurality of flexible batteries 100 is not limited to parallel connection, and the plurality of flexible batteries 100 may be connected in series according to the purpose of use.

In the present invention, the conductive members 400*a* and 400*b* may have a form in which an insulator is coated on an outer surface of a conductor, and the conductive members 400*a* and 400*b* may be physically connected to one of the positive electrode terminals 118*a* and the negative electrode terminals 118*b* through welding or soldering after partially exposing the conductor to the outside.

Figure 3:
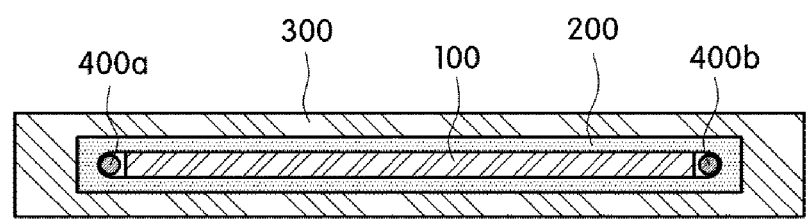
FIG. 3 is a cross-sectional view in direction A-A in FIG. 1.

In this case, as shown in FIGS. 2 and 3, the conductive members 400*a* and 400*b* may be disposed to located at both side surfaces of the plurality of flexible batteries 100. That is, the conductive members 400*a* and 400*b* may be disposed not to overlap an upper surface and a lower surface of the flexible battery 100.

Accordingly, in the flexible battery connection structure 1000 or 1000' according to one embodiment of the present invention, since an entire thickness may be prevented from increasing as much as thicknesses of the conductive members 400*a* and 400*b*, the entire thickness of the flexible battery connection structure 1000 or 1000' may be decreased.

Meanwhile, the flexible battery connection structure 1000 or 1000' may further include a circuit part 500.

As shown in FIG. 2, the circuit part 500 may be implemented in a form in which a charging circuit is mounted on a circuit board. As an example, the circuit part 500 may include a converter (not shown) which lowers an output voltage provided from the flexible batteries 100 to a voltage suitable for wired charging and then transmits the lowered voltage to an external electronic device which is an object to be charged.

The above-described circuit part 500 may be disposed on one end portion of at least one of the plurality of flexible batteries 100, but is not limited thereto, and may be disposed on one surface of the flexible battery.

Meanwhile, the flexible battery connection structure 1000 or 1000' according to one embodiment of the present invention may include the housing 300.

The above-described housing 300 may be provided to simultaneously surround the plurality of flexible batteries 100, the connection members 200, and conductive members 400*a* and 400*b*.

Accordingly, the plurality of flexible batteries 100, the connection members 200, and the conductive members 400*a* and 400*b* which are connected to each other may be prevented from being exposed to the outside.

In this case, the housing 300 may be formed of a material which prevents the permeation of moisture and improves heat resistance, and may be formed of a material having flexibility like the connection member 200. As an example, the housing 300 may be a shrink tube having a known heat resistance which is formed to have a characteristic of shrinking when hardened after heating and closes the inside during shrinkage.

Accordingly, the flexible battery connection structure 1000 or 1000' according to one embodiment of the present invention may be freely deformed when an external force is applied, and may be embedded in a product which demands flexibility.

Meanwhile, the flexible battery connection structure 1000 or 1000' according to one embodiment of the present invention may include a connection terminal 510 formed to be exposed to the outside at one side thereof, and the connection terminal 510 may be electrically connected to the circuit part 500.

The above-described connection terminal 510 may serve as a path which discharges power supplied from the flexible battery 100.

Accordingly, when the connection terminal 510 is electrically connected to an external electronic device which needs to be charged, since the power supplied from the flexible battery is provided to the external electronic device through the connection terminal 510, a battery of the external electronic device may be charged. Here, the connection terminal 510 may be a USB port type.

Further, the flexible battery connection structure 1000 or 1000' according to one embodiment of the present invention may further include a charging terminal 520 configured to recharge the flexible battery 100 in addition to the connection terminal 510.

The above-described charging terminal 520 may be electrically connected to the circuit part 500. Accordingly, when the flexible battery 100 needs to be recharged, the plurality of flexible batteries 100 constituting the flexible battery connection structure 1000 or 1000' may be recharged by receiving power from the outside through the charging terminal 520.

In the drawings, the connection terminal 510 and the charging terminal 520 are illustrated and described as being separately formed, but are not limited thereto, and the charging terminal 520 providing a charging path of the flexible batteries and the connection terminal 510 providing a discharging path of the flexible batteries may be provided in an integrated form.

Figure 7:
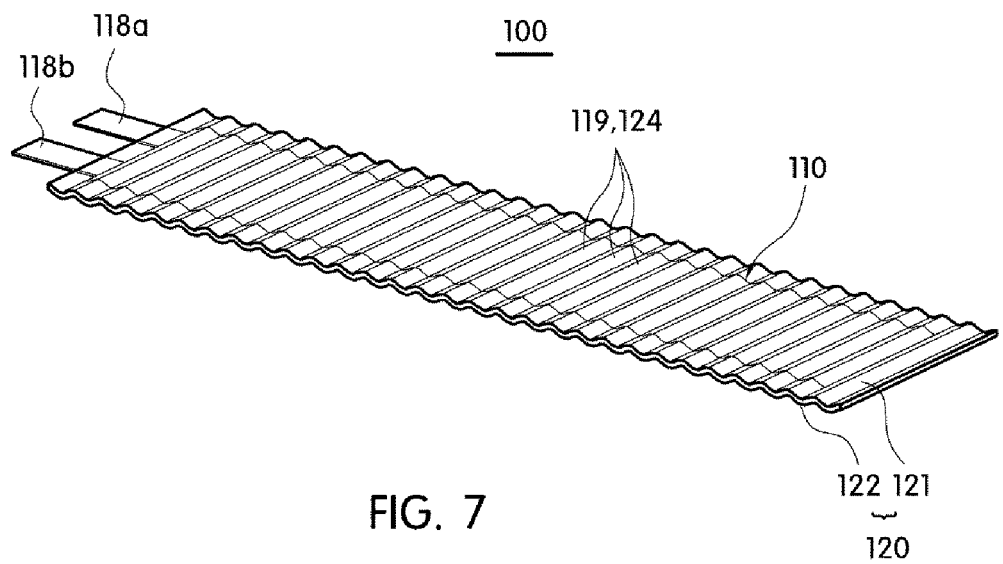
FIG. 7 is a view illustrating a flexible battery applicable to the flexible battery connection structure according to one embodiment of the present invention.
Figure 8:
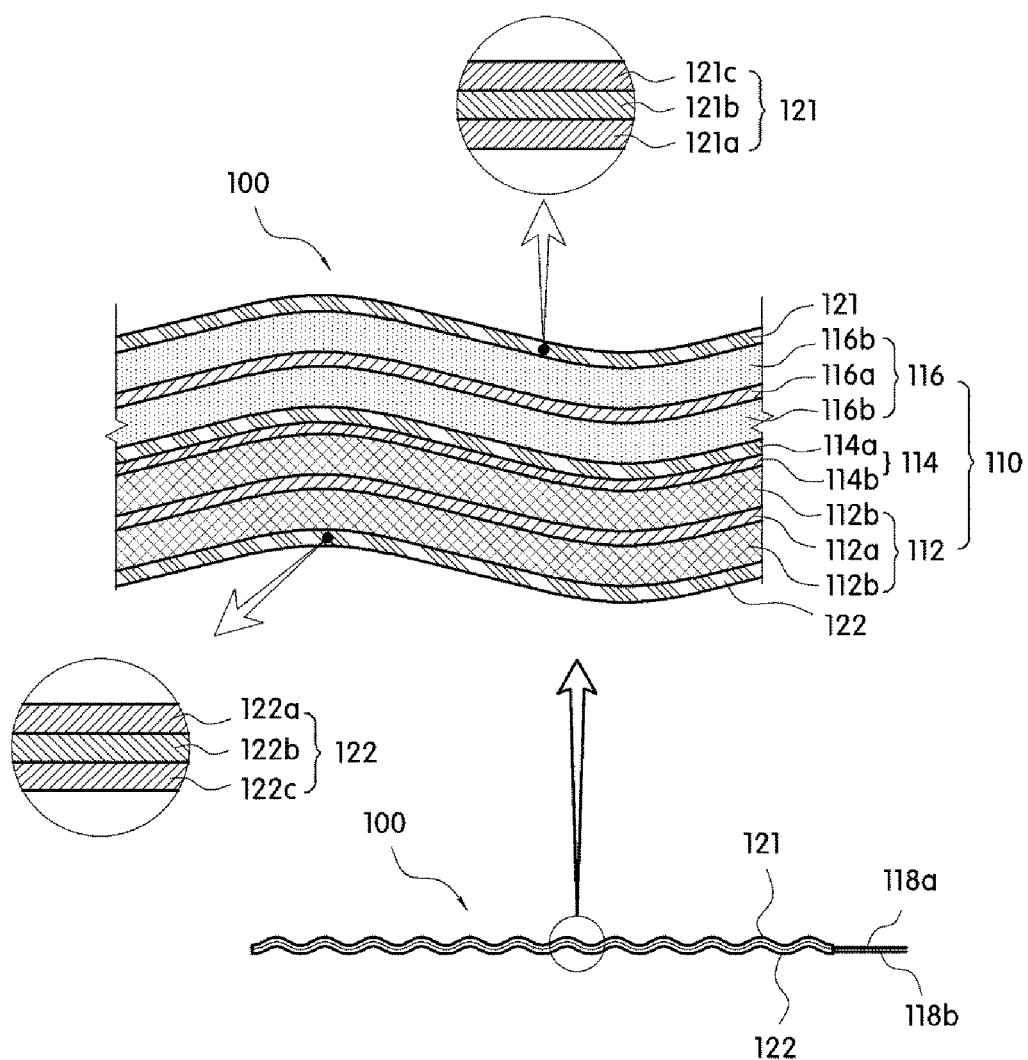
FIG. 8 is a view illustrating various shapes of patterns formed in an exterior material and an electrode assembly in FIG. 7.
Figure 9:
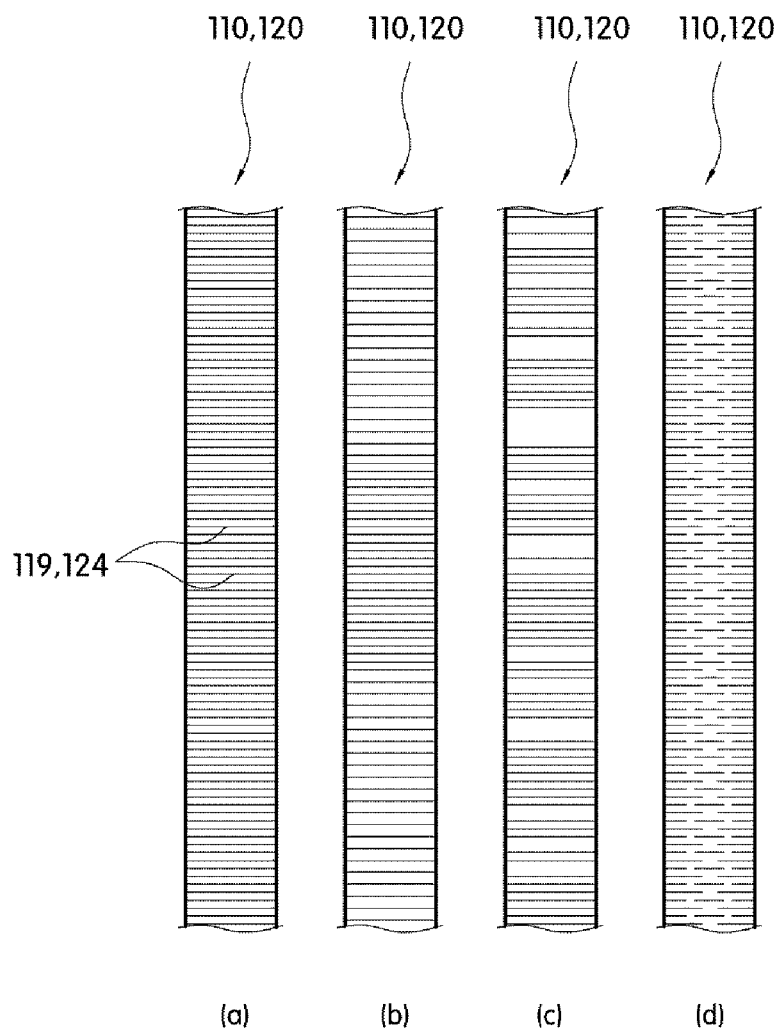
FIG. 9 is an enlarged cross-sectional view of a detailed configuration in FIG. 7.

Meanwhile, as shown in FIGS. 7 to 9, the above-described flexible battery 100 may include an electrode assembly 110 and exterior materials 121 and 122.

That is, the flexible battery 100 may have a form in which the electrode assembly 110 is encapsulated inside the exterior material 120 together with an electrolyte.

In this case, the flexible battery 100 may be formed in a plate shape having flexibility, and may include patterns 119 and 124 for contraction and relaxation in a longitudinal direction.

That is, the electrode assembly 110 and the exterior material 120 may have the patterns 119 and 124 respectively formed therein for contraction and relaxation in the longitudinal direction, and the patterns 119 and 124 may be formed along longitudinal directions of the electrode assembly 110 and the exterior material 120.

Further, the first pattern 119 formed in the electrode assembly 110 and the second pattern 124 formed in the exterior material 120 may be formed to have the same directivity.

Accordingly, since a deformation amount of a base material which may occur at curved portions is minimized even when the electrode assembly 110 and the exterior material 120 are bent or embedded in a curved state, damage to or degradation in performance of the electrode assembly 110 and the exterior materials 121 and 122 may be prevented.

In this case, the first pattern 119 and the second pattern 124 may be disposed to not only have the same directivity but coincide with each other. Accordingly, the same behavior may occur in the first pattern 119 and the second pattern 124.

As described above, in the flexible battery 100, since the first pattern 119 and the second pattern 124 respectively formed in the electrode assembly 110 and the exterior material 120 are formed to coincide with each other, the electrode assembly 110 and the exterior materials 121 and 122 may always maintain a uniform interval or a contact state with respect to the entire length of the flexible battery 100 even when the flexible battery 100 is curved or bent in the longitudinal direction.

Accordingly, since the electrolyte encapsulated with the electrode assembly 110 is uniformly dispersed over the entire length of the flexible battery 100, the degradation in performance of the flexible battery 100 as a battery may be prevented even when bent or curved.

To this end, the first pattern 119 and second pattern 124 may be formed in a direction in which peak portions and valley portions thereof are parallel to width directions of the exterior materials 121 and 122 and electrode assembly 110, and the peak portions and the valley portions may be alternately disposed along the longitudinal directions of the exterior materials 121 and 122 and the electrode assembly 110.

Further, in the peak portions and the valley portions constituting the first pattern 119 and the second pattern 124, since the peak portions are disposed at the same position, and the valley portions are disposed at the same position, the first pattern 119 and the second pattern 124 may coincide with each other.

Specifically, the peak portions and the valley portions of the first pattern 119 and the second pattern 124 may be formed in a parallel direction on the basis of a straight line parallel to width directions of the exterior material 120 and the electrode assembly 110, and the peak portions and the valley portions may be repeatedly disposed along a longitudinal direction.

In this case, the patterns 119 and 124 may be continuously or discontinuously formed in a direction parallel to the width directions of the exterior material 120 and the electrode assembly 110, may be formed throughout the entire lengths of the electrode assembly 110 and the exterior material 120, or may be partially formed in some of the entire lengths.

Here, the peak portions and the valley portions may each have any one cross-sectional surface including one or more selected from an arc-shaped cross-sectional surface including a half circle, a polygonal cross-sectional surface including a triangle or a quadrangle, and a combination of the arc-shaped cross-sectional surface and the polygonal cross-sectional surface, and the peak portions and the valley portion may be provided to have the same pitch and width but may be provided to have different pitches and widths.

Accordingly, even when the electrode assembly 110 and the exterior material 120 are bent or embedded in the curved state in use, fatigue applied to the base material through the patterns 119 and 124 may be reduced.

As an example, as shown in FIG. 4, even when the flexible battery 100 is bent in a state of being embedded in the flexible battery connection structure 1000 or 1000', since an amount of change in length which may occur at a bent portion may be offset through the patterns 119 and 124, degradation in performance may be prevented.

Meanwhile, in the first pattern 119 and the second pattern 124, intervals between the peak portions adjacent to each other or intervals between the valley portions adjacent to each other may be formed to be the same or different, and the peak portions and the valley portions may be provided to have a combination of the same interval and different intervals.

Further, the second pattern 124 formed in the exterior material 120 may be formed in an entire surface of the exterior material 120 or may be partially formed in the exterior material 120.

The electrode assembly 110 may be encapsulated in the exterior material 120 together with the electrolyte, and as shown in FIG. 9, may include a positive electrode 112, a negative electrode 116, and a separator 114.

The positive electrode 112 may include a positive electrode current collector 112a and a positive electrode active material 112b, the negative electrode 116 may include a negative electrode current collector 116a and a negative electrode active material 116b, and each of the positive electrode current collector 112a and the negative electrode current collector 116a may be implemented in a plate type sheet shape having a predetermined area.

That is, in the positive electrode 112 and the negative electrode 116, the active materials 112b and 116b may be compressed, deposited, or coated on one surface or both surfaces of the current collectors 112a and 116a, respectively. In this case, the active materials 112b and 116b may be applied on entire areas of the current collectors 112a and 116a and may also be partially applied on some of the areas of the current collectors 112a and 116a.

Further, a positive electrode terminal 118a and a negative electrode terminal 118b for electrical connection with an external device may be respectively formed at bodies of the positive electrode current collector 112a and the negative electrode current collector 116a.

In this case, the positive electrode active material 112b and the negative electrode active material 116b may include a polytetrafluoroethylene (PTFE) component to prevent the positive electrode active material 112b and the negative electrode active material 116b from being respectively peeled from the current collectors 112a and 116a or a crack occurring when bent.

Meanwhile, although a conventional material used in an electrode assembly may be used for the separator 114 disposed between the positive electrode 112 and the negative electrode 116, the separator 114 may include a nonwoven fabric layer 114a and a nanofiber web layer 114b disposed on one surface or both surfaces of the nonwoven fabric layer 114a.

Here, the nanofiber web layer 114b may be a nanofiber including at least one selected from a polyacrylonitrile nanofiber and a polyvinylidene fluoride nanofiber.

Preferably, the nanofiber web layer 114b may be composed of only the polyacrylonitrile nanofiber to secure radial properties and uniform porosity formation.

The exterior material 120 may be formed of a plate-shaped member having a predetermined area, and may protect the electrode assembly 110 from an external force by accommodating the electrode assembly 110 and the electrolyte therein.

To this end, the exterior material 120 may include a pair of a first exterior material 121 and a second exterior material 122, and in the pair of the first exterior material 121 and the second exterior material 122, edges facing each other may be sealed by an adhesive.

Accordingly, the electrolyte and electrode assembly 110 accommodated in the exterior material 120 may be prevented from being exposed to the outside and leaking to the outside.

In the exterior material 120, the first exterior material 121 and the second exterior material 122 may be formed of two members and may have a form in which one member is folded in half along a width direction or a longitudinal direction.

The above-described flexible battery connection structure 1000 or 1000' may be implemented as an auxiliary battery having a predetermined length, or may be embedded in another product, for example, a product such as a belt, and may serve as a power source configured to supply power to an external electronic device such as a mobile phone.

As a non-limiting example, the flexible battery connection structure 1000 or 1000' may be implemented as a belt 2000.

Figure 10:
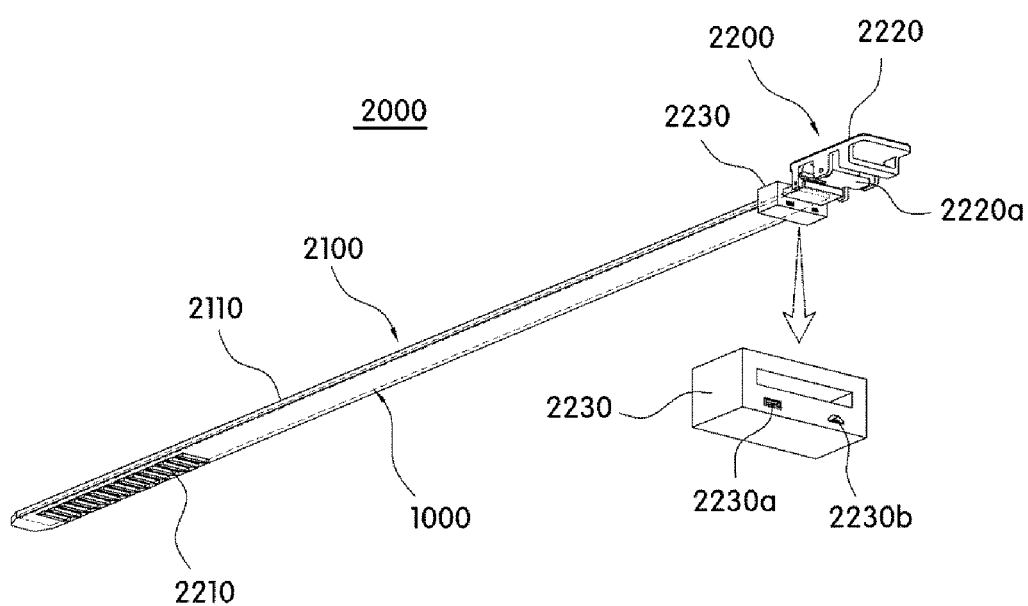
FIG. 10 is a view illustrating a case in which the flexible battery connection structure according to one embodiment of the present invention is implemented as a belt.

As a specific example, as shown in FIG. 10, the belt 2000 may include a belt portion 2100, a fastening part 2200 and the above-described flexible battery connection structure 1000 or 1000', and may be a waistband worn around a waist of a user.

The belt portion 2100 may surround the waist of the user to prevent clothing from falling down or hold the fit of the clothing.

To this end, the belt portion 2100 may be provided to have a predetermined length, and formed of a soft material such as leather, fabric, or the like. As an example, the belt portion 2100 may be provided in a form in which a pair of outer covers 2110 are sealed or laminated through an adhesive. Here, the pair of outer covers 2110 may be formed of two members, and may have a form in which one body is folded.

In this case, the flexible battery connection structure 1000 or 1000' may be embedded in the belt portion 2100. Accordingly, since power is provided from the flexible battery connection structure 1000 or 1000' embedded in the belt portion 2100, the belt 2000 may supply power to an external electronic device such as a mobile phone.

Accordingly, when the external electronic device has to be charged, the belt 2000 according to one embodiment of the present invention may conveniently charge the battery of the external electronic device regardless of location using the power provided from the flexible battery connection structure 1000 or 1000' embedded in the belt portion 2100.

As shown in FIG. 10, the fastening part 2200 may include a plurality of protruding bars 2210 protruding from one surface of the belt portion 2100 along a longitudinal direction, and a buckle 2220 having an engaging bar 2220a inserted into a space between the protruding bars 2210 adjacent to each other when the belt portion 2100 moves by sliding. Further, the fastening part 2200 may further include a supporter 2230 configured to support the belt portion 2100 in a state in which the protruding bars 2210 are inserted into the engaging bar 2220a.

Here, although a case in which the protruding bars 2210 are formed to protrude from one surface of the belt portion 2100 is shown and described, the present invention is not limited thereto, and the protruding bars 2210 may be formed in the form of grooves recessed in one surface of the belt portion 2100.

Further, the fastening part 2200 is not limited to the above method, and when an end portion of the belt portion 2100 is fixed so that the belt portion 2100 may maintain a state of surrounding the waist of the user, various known methods may be applied. As an example, the various known methods such as a lever method, a fixing method using a corresponding magnet, and the like may be applied to the fastening part 2200.

Meanwhile, the belt 2000 according to one embodiment of the present invention may include exposing ports 2230a and 2230b formed in the fastening part 2200 so that the connection terminal 510 and the charging terminal 520 of the above-described flexible battery connection structure 1000 or 1000' may be exposed to the outside.

As an example, the exposing port 2230a and 2230b may be formed in the supporter 2230, and the connection terminal 510 and the charging terminal 520 of the above-described flexible battery connection structure 1000 or 1000' may be disposed at positions corresponding to the exposing ports 2230a and 2230b formed in the supporter 2230.

Accordingly, the connection terminal 510 and the charging terminal 520 provided in the flexible battery connection structure 1000 or 1000' may be exposed to the outside through the exposing ports 2230a and 2230b, and may be protected from an external force by the supporter 2230.

Meanwhile, although an example in which a waistband as the belt 2000 to which the above-described flexible battery connection structure 1000 or 1000' is applied is described, the present invention is not limited thereto, and the belt 2000 may be a suspender which prevents clothing from falling down, or may be a belt provided in a backpack, a bag, or the like. Further, the belt 2000 may be applied to a tool belt worn to accommodate various tools needed for work. In this case, the above-described fastening part 2200 may be changed to proper shapes.

Further, the flexible battery connection structure 1000 or 1000' according to one embodiment of the present invention may be implemented in a form of a headband or a fixing strap of an electronic product which is wearable on the body and requires a battery such as a virtual reality (VR) device, an augmented reality (AR) device, or smart goggles in addition to the belt described above, and may be implemented in a form of an auxiliary battery.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. A flexible battery connection structure comprising:
a plurality of flexible batteries electrically connected to each other, disposed along a longitudinal direction, wherein each flexible battery includes a positive electrode terminal and a negative electrode terminal protruding from one end portion;
a connection member disposed at positions corresponding to the positive electrode terminal and the negative electrode terminal configured to protect the positive electrode terminal and the negative electrode terminal and to connect two flexible batteries adjacent to each other;
a housing configured to surround the plurality of flexible batteries connected to each other through the connection member; and
two conductive members disposed to be located at both side surfaces of each flexible battery so as to electrically connect the plurality of flexible batteries,
wherein each of the positive electrode terminal and the negative electrode terminal extends a predetermined length from one end portion of each flexible battery along a direction parallel to the longitudinal direction of each flexible battery, and is disposed to be located between the two flexible batteries adjacent to each other, and
wherein the connection member is disposed to surround each end portion of each flexible battery with the positive electrode terminal and the negative electrode terminal.

2. The flexible battery connection structure of claim 1, wherein the two flexible batteries adjacent to each other among the plurality of flexible batteries are disposed so that the positive electrode terminal and the negative electrode terminal are disposed to face each other or so that some of the lengths thereof overlap each other.

3. The flexible battery connection structure of claim 1, wherein each of the connection member and the housing are formed of a material having flexibility.

4. The flexible battery connection structure of claim 3, wherein the housing is a shrink tube having heat resistance.

5. The flexible battery connection structure of claim 3, wherein the connection member is formed of an acrylic resin or a Teflon resin.

6. The flexible battery connection structure of claim 1, wherein the conductive members connect the plurality of flexible batteries in parallel.

7. The flexible battery connection structure of claim 1, comprising at least one connection terminal for electrical connection to an external electronic device.

8. The flexible battery connection structure of claim 1, wherein at least one flexible battery includes patterns for contraction and relaxation in a longitudinal direction when bent.

9. The flexible battery connection structure of claim 8, wherein:
the at least one flexible battery includes an electrode assembly; and an exterior material which encapsulates the electrode assembly and an electrolyte;
the patterns include a first pattern formed in the electrode assembly and a second pattern formed in the exterior material; and
the first pattern and the second pattern are formed to coincide with each other.

10. A belt comprising:
a belt portion having a predetermined length and configured to surround a waist of a user;
a fastening part configured to fasten or unfasten both end portions of the belt portion; and
a flexible battery connection structure embedded in the belt portion,
wherein the flexible battery connection structure includes:
a plurality of flexible batteries electrically connected to each other, disposed along a longitudinal direction, wherein each flexible battery includes a positive electrode terminal and a negative electrode terminal protruding from one end portion;
a connection member disposed at positions corresponding to the positive electrode terminal and the negative electrode terminal configured to protect the positive electrode terminal and the negative electrode terminal and to connect two flexible batteries adjacent to each other;
a housing configured to surround the plurality of flexible batteries connected to each other through the connection member; and
two conductive members disposed to be located at both side surfaces of each flexible battery so as to electrically connect the plurality of flexible batteries,
wherein each of the positive electrode terminal and the negative electrode terminal extends a predetermined length from one end portion of each flexible battery along a direction parallel to the longitudinal direction of each flexible battery, and is disposed to be located between the two flexible batteries adjacent to each other, and
wherein the connection member is disposed to surround each end portion of each flexible battery with the positive electrode terminal and the negative electrode terminal.

11. The belt of claim 10, wherein the fastening part includes at least one connection terminal for electrical connection to an external electronic device.

12. The belt of claim 10, wherein the two flexible batteries adjacent to each other among the plurality of flexible batteries are disposed so that the positive electrode terminal and the negative electrode terminal are disposed to face each other or so that some of the lengths thereof overlap each other.

13. The belt of claim 10, wherein each of the connection member and the housing are formed of a material having flexibility.

14. The belt of claim 10, wherein the conductive members connect the plurality of flexible batteries in parallel.

15. The belt of claim 10, wherein at least one flexible battery includes patterns for contraction and relaxation in a longitudinal direction when bent.

16. The belt of claim 15, wherein:
the at least one flexible battery includes an electrode assembly; and an exterior material which encapsulates the electrode assembly and an electrolyte;
the patterns include a first pattern formed in the electrode assembly and a second pattern formed in the exterior material; and
the first pattern and the second pattern are formed to coincide with each other.

* * * * *